(12) United States Patent
Legrand

(10) Patent No.: US 6,256,886 B1
(45) Date of Patent: *Jul. 10, 2001

(54) DEVICE FOR CUTTING VEGETATION

(75) Inventor: Emmanuel Legrand, Villeneuve (FR)

(73) Assignee: Speed France, Villefranchie sur Saone (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,364

(22) Filed: Jul. 21, 1998

(30) Foreign Application Priority Data

Jul. 22, 1997 (FR) .................................................. 97 09538

(51) Int. Cl.$^7$ ................. B25F 3/00; B26B 1/00; B26B 11/00; B26B 3/00
(52) U.S. Cl. .................. 30/123.3; 30/276; 30/347; 56/12.7; 239/104
(58) Field of Search .................. 56/16.8, 12.7, 56/12.1; 30/276, 347, 123.3; 83/177; 239/104

(56) References Cited

U.S. PATENT DOCUMENTS

| | | | |
|---|---|---|---|
| 3,090,187 | * | 5/1963 | Livingston .............................. 56/16.8 |
| 4,499,710 | | 2/1985 | Bolton . |
| 5,148,992 | | 9/1992 | Morrow . |
| 5,456,412 | * | 10/1995 | Agee .................................... 239/104 |

FOREIGN PATENT DOCUMENTS

| | | |
|---|---|---|
| 31 35 927 | 3/1983 | (DE) . |
| 93 00 077 | 4/1993 | (DE) . |
| 2 312 953 | 6/1976 | (FR) . |
| 2 677 903 | 12/1992 | (FR) . |
| 2 093 327 | 9/1982 | (GB) . |

* cited by examiner

Primary Examiner—Lee Young
Assistant Examiner—Rick Kiltae Chang
(74) Attorney, Agent, or Firm—Herbert Dubno

(57) ABSTRACT

This method, offering quiet, pollution-free cutting, consists in emitting at least one pressurized jet of water which is directed at and moved over the vegetation to be cut, the pressurized jet or jets of water being themselves the cause, by mechanical reaction, of their movement, in particular their rotary movement. The cutting device that puts this method into effect comprises means for supplying water at pressure, and a rotating head provided at its periphery with at least one nozzle through which a cutting jet of water is ejected, the jet or jets of water generating, by reaction, rotation of the head and therefore of the jet or jets themselves. This device may be in the form of a portable appliance.

11 Claims, 5 Drawing Sheets

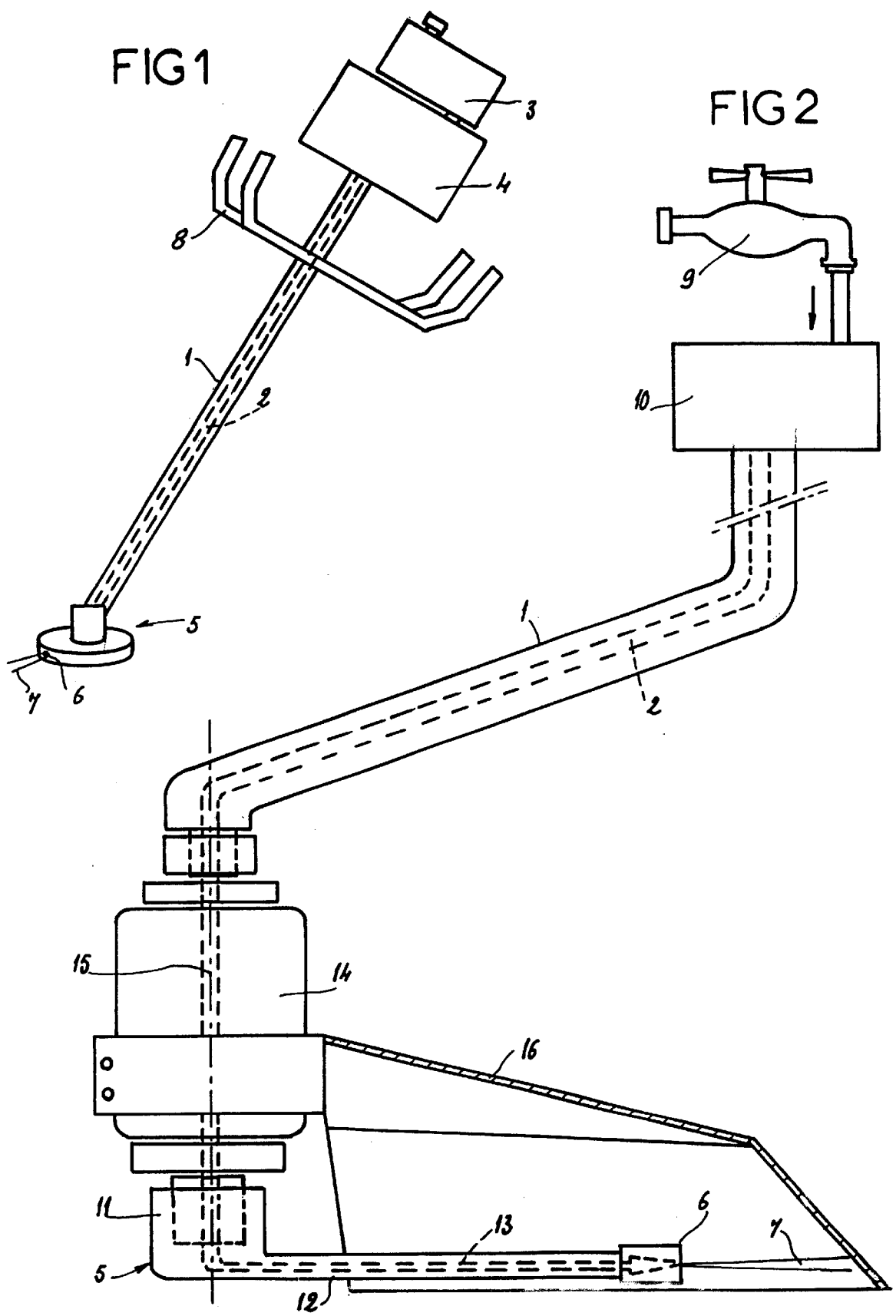

DEVICE FOR CUTTING VEGETATION

FIELD OF THE INVENTION

The present invention relates to a method for cutting vegetation, and to a device for putting this cutting method into effect.

BACKGROUND OF THE INVENTION

For several decades now, the mechanized cutting of vegetation has been habitually performed by machines or appliances powered by electricity or fuel, in which one or more metal or synthetic blades, or synthetic cords, or indeed any other cutting member capable of cutting the vegetation encountered in its path, is propelled at high speed. These machines or appliances include in particular lawnmowers on the one hand, and grass trimmers and edge trimmers on the other, the latter appliances having a rotary head driven at high speed and turning one or more synthetic cords.

With this type of machine or appliance, it is the violent impact (due to the speed of rotation generated by the motor) of more or less sharp objects, such as the blades of lawnmowers or the cords of trimmers, on the vegetation that performs the cutting work by a "smashing" action: a non-moving lawnmower blade or trimmer cord has no cutting power in itself, and only the fact that these parts are spun at high speed can cut vegetation. Hence, in order to function effectively, existing machines and appliances are usually polluting and noisy and consume electricity or fuel and oil in order to produce the necessary motive force.

In the case of grass and edge trimmers, attempts have already been made to reduce the noise by giving the cutting cord special configurations, such as twisted or undulating shapes. However, this only partly solves the problem because the noise of the motor itself is of course not suppressed, and moreover pollution is not reduced.

It is against this background that a number of standards are currently being set up in order to reduce all forms of pollution (noise, chemical, etc.) generated by machines and appliances for the upkeep of vegetation.

Besides the conventional solutions cited above, proposals have been made for systems that cut vegetation with jets of water. Examples that may be cited here are documents DE-A-3135927, DE-U-9300077, GB-A-2093327 and FR-A-2312953.

All these documents utilize the principle of "fixed" cutting jets which are only moved past the vegetation to be cut by the forward motion of the appliance on which the jet emitting means are supported, the speed of the jets relative to the vegetation to be cut thus remaining very small. These systems retain a number of disadvantages in particular:

A fixed or virtually fixed jet is liable simply to press the vegetation which it encounters down on the ground without cutting it, especially in the case of fine vegetation such as grass.

In order to "sweep" a certain width of ground, known systems use a larger number of jets, arranging them one behind the other; this means that separating fingers must be positioned opposite the jet ejecting nozzles in such a way as to direct the vegetation toward the jets.

Most systems proposed to date include means for collecting and recycling the ejected water. This complicates the structure and prevents the water from being used to irrigate or treat the vegetation and/or soil.

Lastly, these known systems are based on replacing a conventional bladed lawnmower with an appliance using transverse jets of water; none of these systems are designed as lightweight—that is, specifically, portable—appliances comparable with modern grass or edge trimmers.

OBJECT OF THE INVENTION

It is an object of the present invention to eliminate the drawbacks of the conventional machines and appliances described above, as well as those of already known jet of water cutting systems, by providing a method and device for cutting vegetation that produces none of the pollution currently observed, and cuts vegetation effectively by simple, inexpensive and lightweight means.

SUMMARY OF THE INVENTION

To this end the subject of the invention is a method of cutting vegetation, according to which there is emitted at least one pressurized jet of water which is directed at and moved over the vegetation to be cut, and wherein the pressurized jet or jets of water are themselves the cause, by mechanical reaction, of their movement, in particular their rotary movement.

Thus, the inventive idea consists in replacing the conventional blades or cutting cords with water in the form of a rotating jet, the observation having been made that water, even at a comparatively low pressure, can be made to exert both a cutting and a "driving" action. Thus the method forming the subject of the invention combines the cutting action of the jet of water with the motive "rotary" action of this jet, this combination being all the more advantageous as the two actions result from the pressure of the water, with no necessity for any supplementary motor means. The result is therefore a very simple and economical cutting method that is also remarkably efficient when compared with the known "fixed" jet systems discussed above. Moreover the rotation of the jet or jets of water makes it an easy matter to "sweep" a certain area of vegetation in need of cutting, and to treat a more or less large area of vegetation, by moving the system around, even with a single jet, i.e. without a multiplicity of nozzles. In addition, the water used here for cutting the vegetation is a natural substance that is available everywhere, is inexpensive and is "ecological", the recovery and recycling of which are surely unnecessary, in contrast to what is indicated in the aforementioned documents. Indeed, the water used in the form of a cutting jet of water in the method according to the invention, and not then recovered, simultaneously waters the ground, and, if it contains additives, treats the vegetation concerned and/or the ground, simultaneously with the cutting action.

In order to augment the cutting power of the pressurized jet of water it is also possible to add, to the water being used in the form of a cutting jet of water, an abrasive, in particular mineral, component of very small particle size, such as silica, sand, glass or marble. In this case, the "Venturi" effect created by the pressurized water enables the abrasive particles stored in a separate container to be transported by suction.

Using a cutting jet of water also presents the advantage of not causing the noise pollution usually generated by a trimmer cord spinning at high speed. At a speed of 8000 revolutions per minute, a 2.4 mm diameter cutting cord generates a sound level of more than 100 decibels, while a jet of water turning at the same speed generates a sound level of less than 80 decibels.

The cutting jet of water also eliminates all the problems of chemical pollution produced by the particles of synthetic material strewn into the environment by the use of cutting cords (some 10,000 tonnes of polyamine cord are dispersed over the Earth in this way each year). Clearly, a jet of water eliminates this large amount of pollution, which it is presently difficult to solve by any other means than photodegradation.

The use of a jet of water will also be found advantageous from the point of view of human safety, in comparison with blades or cutting cords which present a certain risk.

The invention also relates to a device for cutting vegetation, that puts into effect the method defined earlier.

In a generally known way, this device comprises, in combination:

means for supplying water at pressure, means for ejecting the water at pressure in the form of at least one jet of water and directing it at the vegetation to be cut, and means for causing movement of the jet or jets of water.

According to the invention, the means for ejecting the water at pressure and at the same time rotating the jet or jets of water are constructed in the form of a head mounted rotatably relative to a part that supports it, the rotating head being supplied with water at pressure along its axis, through a rotating coupling, and being provided at its periphery with at least one nozzle through which a cutting jet of water is emitted, the rotating head containing at least one water channel between the central water inlet and the or each peripheral nozzle, while the nozzle or nozzles possess, with respect to the rotating head, a tangential or oblique or more generally non-radial orientation, so that, by mechanical reaction, the head, and consequently the jet or jets of water themselves, are caused to rotate.

This solution makes it possible to build appliances similar to a trimmer in configuration and general dimensions, in which appliances the pressurized water thus becomes the driving force that turns the head and jets, at a high speed of up to 10,000 revolutions per minute, the speed of rotation of the head depending on a variety of factors: the pressure of the water generated upstream of the nozzles, the number of nozzles, the distance of the orifice of the nozzle or nozzles from the axis of the head, friction between the head and its non-rotating support, and the mass of the rotating head.

The nozzle or nozzles may be capable of being oriented relative to the rotating head. This will make it possible both to vary the speed of rotation of the head and also to adapt the size of the vegetation-covered area "swept" by the jets of water, so as to enlarge or reduce the size of the said area. As will be readily appreciated, this area is of circular form in the case of a head describing a continuous rotation, and emitting jets of water encountering no obstacles. If required, however, the area cut can be limited to a certain angle, either by means of a simple mechanism that creates a movement of oscillating rotation of the rotary head, or by fitting the appliance with a deflector that intercepts the jet or jets of water emitted within a certain sector, in the course of the continuous rotation of the rotating head. This deflector will in particular intercept the jet or jets of water emitted in the course of the rotation of the head, in the direction of the user of the appliance, and thus constitutes a housing to protect the user from being wetted or otherwise inconvenienced by the jets of water.

Although the invention is based on the principle of cutting the vegetation with one or more pressurized jets of water, the rotary head may support, in addition to the nozzle or nozzles, one or more cutting cords or blades that complement the cutting work of the jet or jets of water. As will be readily appreciated, in the case of such a combination it is the driving force of the pressurized water that turns the blades or cutting cords, as the latter are supported by the head itself, which is turned by the pressure of the water.

In one particular combination, the or each nozzle is situated at the free end of a hollow cord or of a hollow blade, of tubular construction defining a water channel, which is supported by the rotary head and is supplied with water at pressure, said hollow cord or said hollow blade forming in itself a cutting member that complements the action of the jet or jets of water emitted by this cord or blade. This combination is especially judicious because the hollow cord or cords or hollow blades take the form of flexible or rigid tubular members that cut the vegetation within a certain central circle, while the jet or jets of water cut the vegetation beyond this circle, all around the area swept by the cords or blades. This makes the two actions exactly complementary and makes it possible simultaneously to treat as great an area of ground as possible, by greatly enlarging the area swept by the cords or blades.

The means for supplying water at pressure may be made in the form of a water tank built into the device and connected to means for pressurizing the water at the outlet of the tank.

In another possible form, the means for supplying water at pressure consist of an external water main, to which the device is connected. Connection to an existing water main does away with the need for a tank, and the pressure of water supplied by the main may be sufficient to create a cutting jet of water and to cause this jet to move. It can thus be seen that with this embodiment it is possible to reconstruct a trimmer-type cutting appliance that is very simple, lightweight, quiet and economical, having no need for any motor. However, depending on requirements, such an appliance may be improved by the addition of a built-in pressure amplifier, this too being kept to a simple mechanical structure.

The means for supplying water at pressure may also be made in the form of a conventional pressurizer, supplying sufficient water pressure to create the cutting jet or jets of water and to move this or these jet or jets of water.

BRIEF DESCRIPTION OF THE DRAWING

A clearer understanding of the invention will be gained from the following description, which refers to the accompanying schematic drawing illustrating, a number of embodiments of this vegetation cutting device. In the drawing:

FIG. 1 is a highly schematic side view of a vegetation cutting device in accordance with the present invention, in the form of a self-contained appliance;

FIG. 2 is a skeleton diagram of another vegetation cutting device according to the invention, for fitting to existing equipment;

DESCRIPTION OF THE PREFERRED EMBODIMENTS

Figure 3:
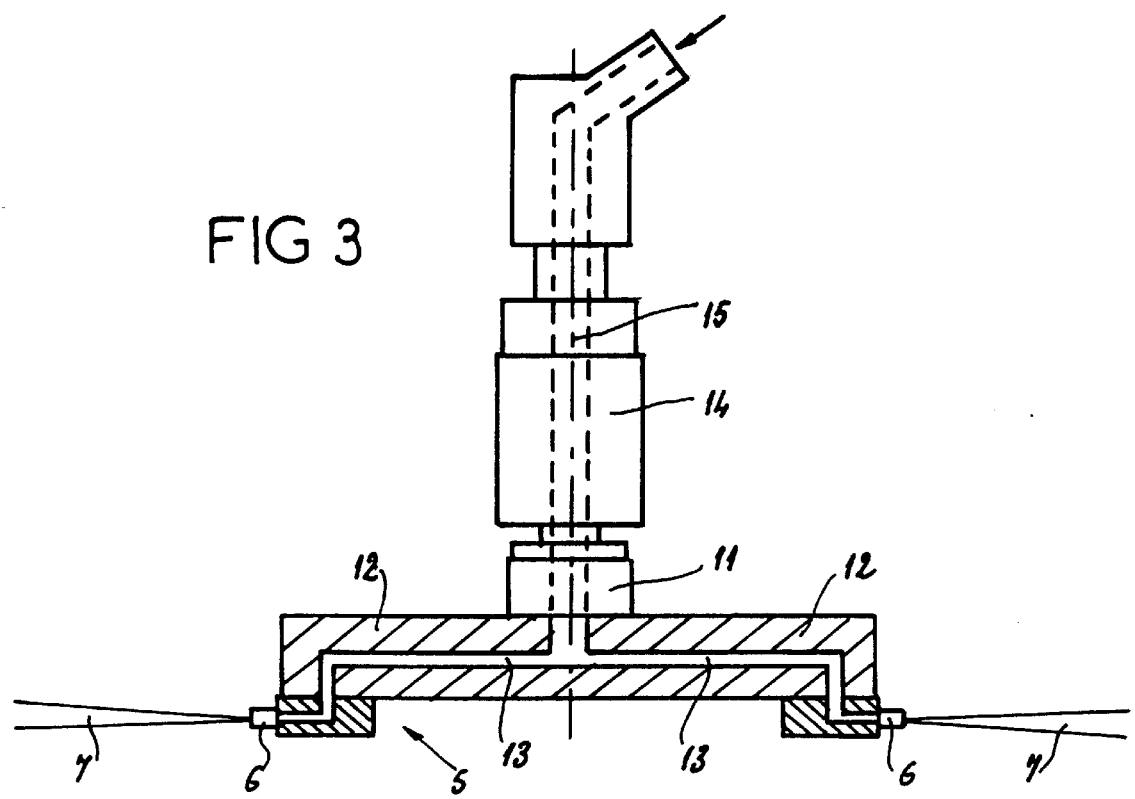
FIG. 3 is a side view, with partial section, of an example of a rotary head for a device in accordance with the invention.

FIG. 1 shows a self-contained portable appliance for cutting vegetation with a pressurized jet of water. The appliance comprises a rigid central tube 1 defining a water channel 2. At the top of the appliance is a water tank 3 and an electric or fuel-burning pump or small pressurizer 4, these means of supplying water at pressure being connected to the starting point of the water channel 2 of the tube 1. Mounted at the lower end of this tube 1 is a rotating head 5 with at least one nozzle 6 in its periphery having a small-diameter outlet orifice for the emission of a cutting jet of water 7 of small cross section. The upper end of the tube 1 also supports a handlebar 8 for holding and controlling the appliance, with suitable handles and grips designed partly for starting/stopping the pressurizer or pump 4, and partly for opening/closing a valve (not shown) to control the delivery of water to the channel 2 and rotating head 5.

In contradistinction to the previous example, FIG. 2 shows a device for cutting vegetation with a pressurized jet of water that connects to existing equipment, in particular to an external water main symbolized by a faucet 9. To the extent that this main does not necessarily supply water at sufficient pressure to enable the device according to the invention to function, an appliance 10 such as an electric or fuel-burning pressurizer, or an electric or fuel-burning or able appliance, is connected into the water circuit between the faucet 9 and the tube 1 containing the water channel 2 and supporting, at its lower end, the rotating head 5. Water at sufficient pressure is thus injected into the channel 2.

As shown in FIG. 2 also, the lower part of the rotating head 5 may comprise a central hub 11 extended by a single radial arm 12 of tubular construction defining a water channel 13, at the free end of which is mounted the nozzle 6, of which there is only one in this example. A rotating coupling 14 provides a watertight transition between the water channel 2 of the tube 1 and the rotating head 5, which latter is supplied with water along its axis of rotation 15. This figure also shows a fixed deflector 16 that intercepts the cutting jet of water 7 around a certain sector, in the course of the rotation of the rotating head 5, and constitutes a protective housing.

FIGS. 3–6 illustrate other embodiments of the rotating head 5.

In FIG. 3 the rotating head 5 comprises a central hub 11 from which there extend two opposing radial arms 12 defining two water channels 13, one in each arm, which supply two nozzles 6 carried on the respective free ends of the two radial arms 12. The two nozzles 6 here emit two diametrically opposed and outwardly-directed cutting jets of water 7. The two radial arms 12 may together be replaced by one disk (see also FIG. 1).

Figure 4:
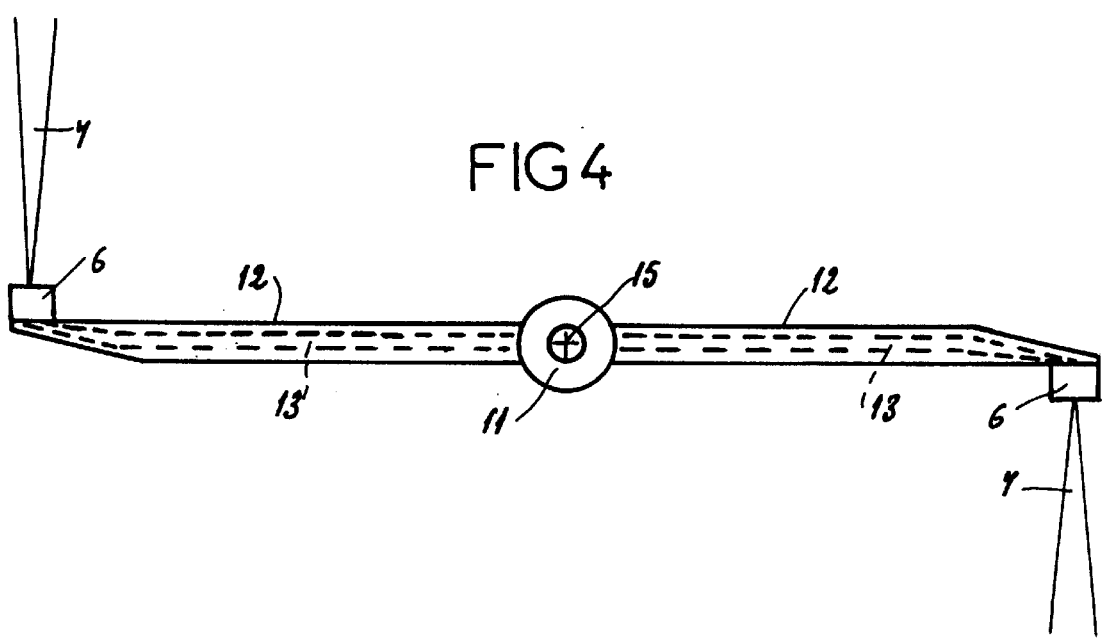
FIG. 4 is a front view of another example of a rotating head.

The rotating head 5 shown in FIG. 4 also has two radial arms 12, of tubular construction with water channels 3, which carry two nozzles 6 at their free ends. In this example the two nozzles 6 are oriented in such a way as to emit two cutting jets of water 7 in tangential directions.

In all cases, by mechanical reaction, the emission of the pressurized jet or jets of water 7 causes rotation of the rotating head 5 about its axis 15 at high speed, and therefore rotation of the jets of water 7 themselves, thus cutting any vegetation encountered. The nozzles 6 can advantageously be oriented, between an almost radial position (FIG. 3) and a tangential position (FIG. 4). By this means it is possible to vary the speed of rotation of the rotating head 5 and, more importantly, to enlarge or restrict the zone of action of the cutting jets of water 7.

Figure 5:
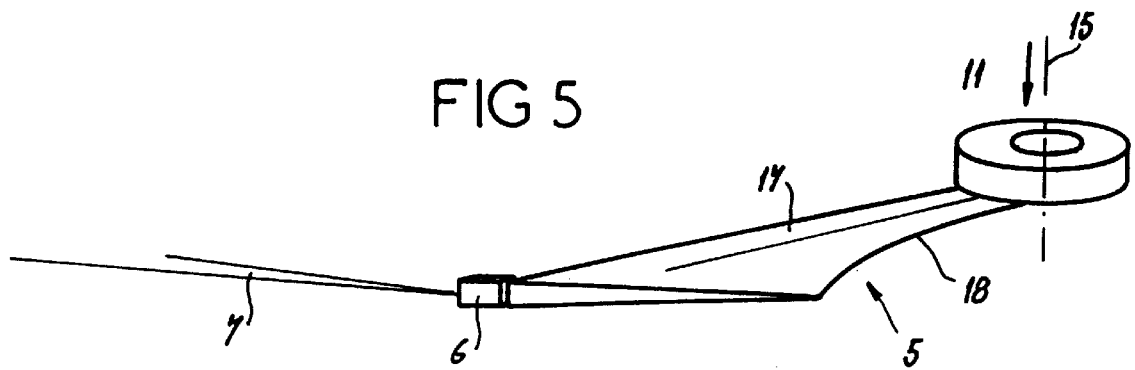
FIG. 5 is a perspective view of a rotary head with a rigid combination blade for cutting and emitting a jet of water.

FIG. 5 shows another rotating head 5 in which the nozzle 6 (of which there is only one in this case) is mounted on the free end of a rigid blade 7, which extends radially out from a hub 11 and which contains an internal water channel (not shown) connected to the central pressurized water inlet. The jet of water 7 emitted by the nozzle 6 exerts a cutting action on the vegetation and spins the head 5 about its axis 15. In the course of this rotation, a cutting edge 18 on the blade 17 exerts on the vegetation a complementary cutting action in the interior of the central circle which is not swept by the jet of water 7.

Figure 6:
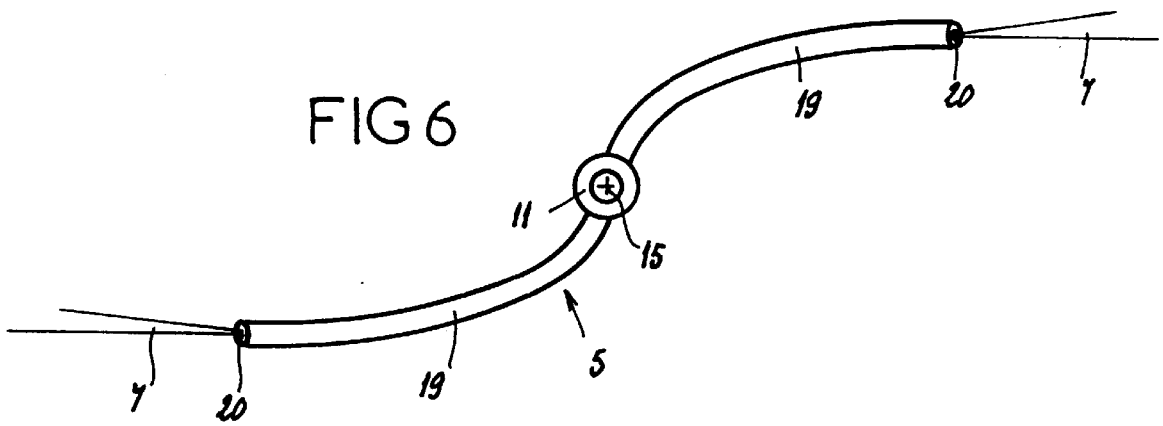
FIG. 6 is a front view of another rotating head with hollow cutting cords that also emit jets of water.

FIG. 6 shows yet another rotating head 5, composed of a central hub 11 from which there extend, in diametrically opposed positions, two small-diameter flexible tubes 19 defining water channels connected to the central pressurized water inlet. The respective free ends 20 of the two flexible tubes 19 form in themselves the two nozzles that emit the cutting jets of water 7. Moreover, as they rotate, the flexible tubes 19 behave as cutting cords which complement the cutting action of the jets of water 7. It will be observed that in this embodiment it is unnecessary to give any particular orientation to the ends 20 that form the nozzles from which the cutting jets of water are emitted because the flexible tubes 19 behave in the same way as does a hosepipe, which, when left free, will spontaneously twist around when emitting a jet of water at pressure.

Figure 7:
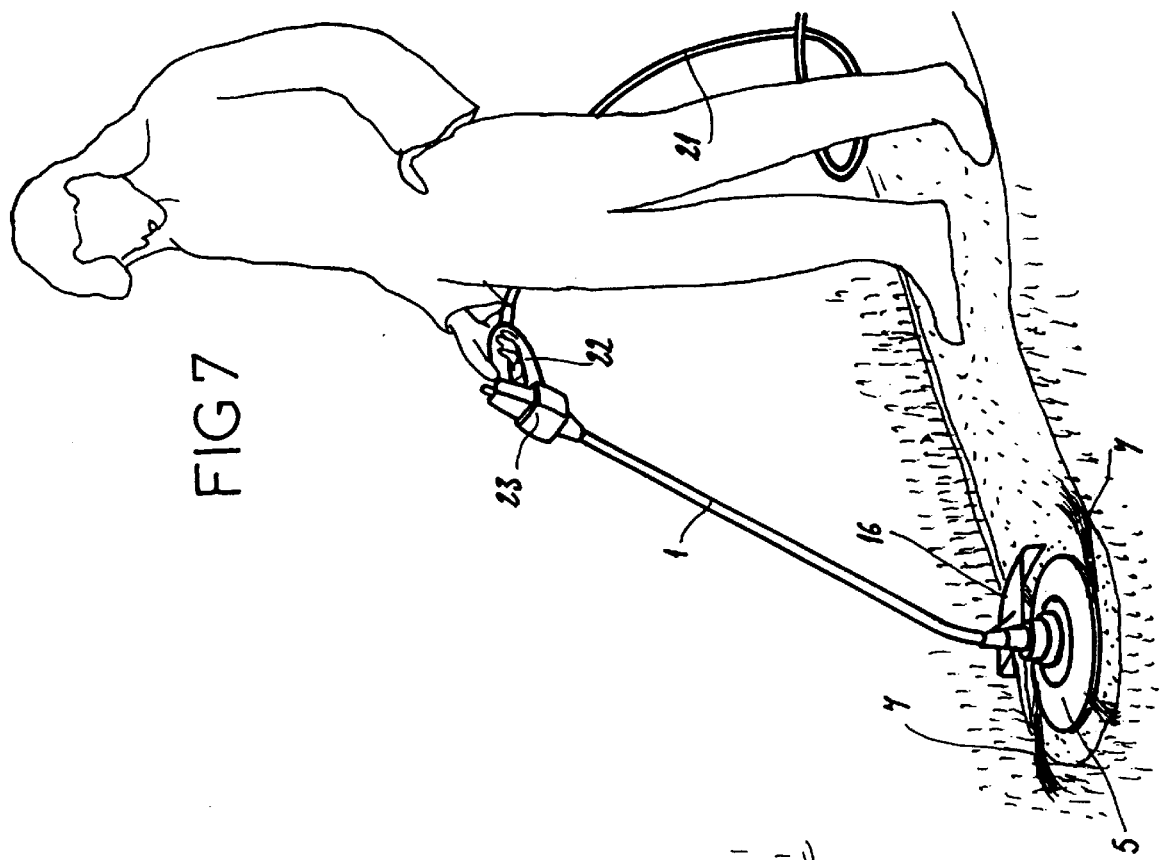
FIG. 7 is a perspective view of a device according to the invention, of simple design, in use.

FIG. 7 shows a possible practical embodiment of a device according to the invention: it is of simple and lightweight design and is supplied directly with water from an external source via a flexible hose 21 at a sufficient pressure for satisfactory operation. The device thus takes the form of a portable, lightweight appliance with a handle 22, a pole consisting of the tube 1 and the rotary head 5, the only control required being a hand-operated valve 23 for controlling the admission of water into the tube 1. FIG. 7 also illustrates the deflector 16 acting as a protective housing vis-a-vis the user of the appliance.

Figure 8:
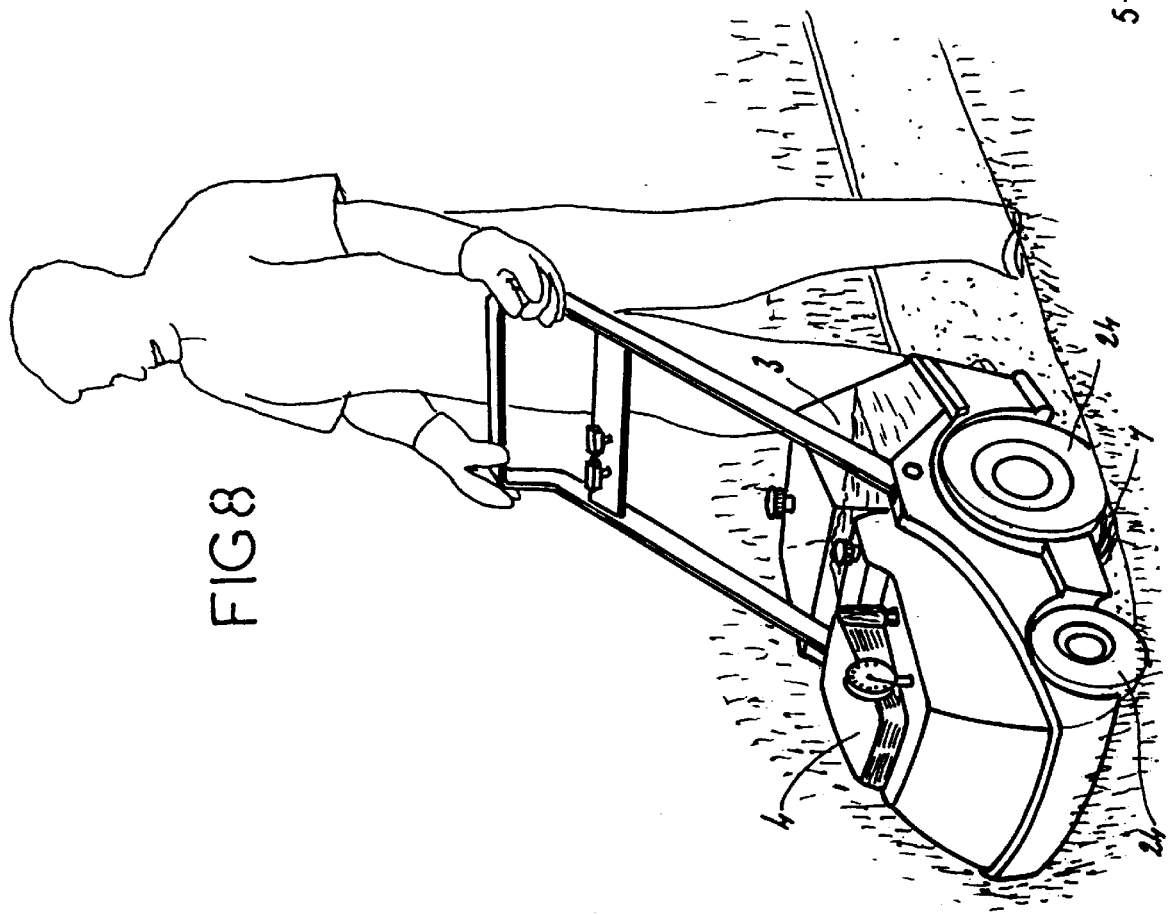
FIG. 8 is a perspective view of a machine mounted on wheels and comprising an application of the device forming the subject-matter of the invention.

Next to this in FIG. 8 is a machine mounted on wheels 24, similar to a lawnmower, which carries a water tank 3 and a pressurizer 4 powered by an engine. The rotating head, emitting one or more cutting jets of water 7, is mounted below the machine. A large machine of this kind can have two rotating heads with parallel axes, whose respective jets of water create a "scissors" action as they intersect.

Figure 9:
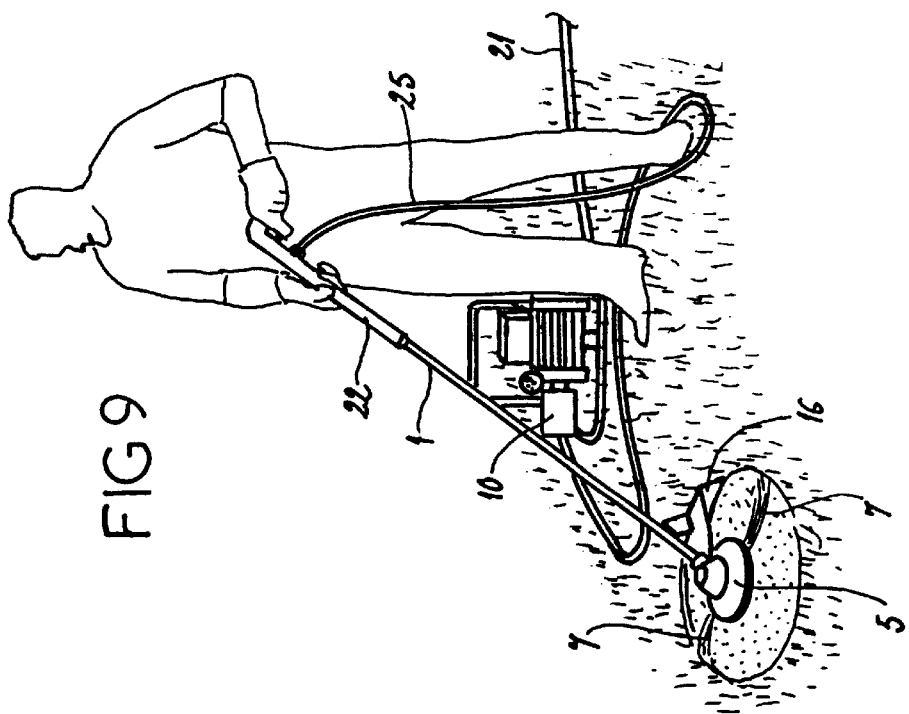
FIG. 9 is a perspective view of a device in accordance with the invention, used with a conventional pressurizer.

FIG. 9 shows a device according to the invention similar to that of FIG. 7, but used with a commercially available electric pressurizer 10 which is placed on the ground. The pressurizer 10 is supplied with water from an external source through a flexible hose 21. Another hose 25 connects the pressurizer 10 to the handle 22 of the appliance, and so supplies the appliance at sufficient pressure for satisfactory operation.

Figure 10:
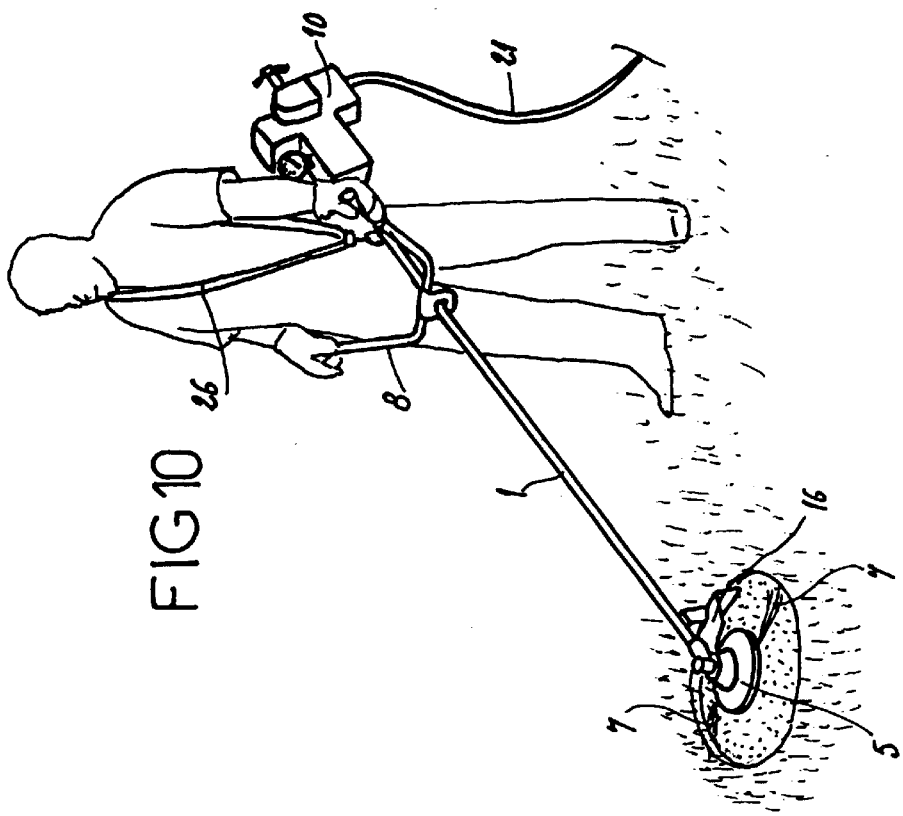
FIG. 10 is a perspective view of another device in accordance with the invention, with a built-in pressurizer, in use.

FIG. 10 shows another device according to the invention, provided with a built-in fuel-burning pressurizer 10 that is supplied with water from an external source through a flexible hose 21. Since by reason of the addition of the pressurizer 10 this portable appliance is relatively heavy, the appliance is fitted with a handlebar 8 and a strap 26 allowing it to be slung over the shoulder.

The water supply means, the water pressurizing means, the details of the shape and structure of the rotating head, and the number of nozzles carried by the rotating head, can be modified while remaining within the scope of the claims.

What is claimed is:

1. A device for cutting vegetation comprising:

means for supplying water under pressure, means connected with the means for supplying for ejecting the water under pressure in a form of at least one jet of water in a direction and in the form so as to cut the vegetation directly with the jet, means for rotating said jet solely by force of the water, the means for supplying for ejecting the water under pressure and the means for rotating the jet including a rotating head mounted rotatably relative to a part that supports the head, the head being supplied with water under pressure along an axis, through a rotating coupling, and being provided at the head periphery with at least one nozzle through which a cutting jet of water is emitted, the cutting jet being emitted in a plane perpendicular to said axis and directly against the vegetation so that the vegetation is directly cut by the cutting jet, the head containing at least one water channel communicating with the nozzle, the nozzle having a nonradial orientation in said plane, so that, by mechanical reaction, the head and the cutting jet are caused to rotate, and at least one cutting cord affixed to said head to complement cutting work of the cutting jet.

2. The device as claimed in claim 1 wherein the nozzle is orientable relative to the rotating head.

3. The device as claimed in claim 1, further comprising a mechanism for oscillating the head.

4. The device as claimed in claim 1 wherein the nozzle is situated at a free end of a hollow cord of tubular construction defining a water channel, which is supported by the rotating head and is supplied with water at pressure, said hollow cord forming a cutting member that complements cutting action of the cutting jet.

5. The device as claimed in claim 1, in a form of a portable appliance comprising a rigid central tube that defines a water channel, the tube being equipped at an upper end with a handle, the head being mounted at a lower end of said tube.

6. The device as claimed in claim 1 wherein the means for supplying water under pressure are made in a form of a water tank built into the device and connected to means for pressurizing the water at an outlet of the tank.

7. The device as claimed in claim 6 wherein the pressurizing means consists of a pressurizer positioned on the device at the outlet of the water tank.

8. A device for cutting vegetation comprising:

means for supplying water under pressure, means connected with the means for supplying for ejecting the water under pressure in a form of at least one jet of water in a direction and in the form so as to cut the vegetation directly with the jet, means for rotating said jet solely by force of the water, the means for supplying for ejecting the water under pressure and the means for rotating the jet including a rotating head mounted rotatably relative to a part that supports the head, the head being supplied with water under pressure along an axis, through a rotating coupling, and being provided at the head periphery with at least one nozzle through which a cutting jet of water is emitted, the cutting jet being emitted in a plane perpendicular to said axis and directly against the vegetation so that the vegetation is directly cut by the jet, the head containing at least one water channel communicating with the nozzle, the nozzle having a nonradial orientation in said plane, so that, by mechanical reaction, the head and the jet are caused to rotate, and means on said head apart from said jet for mechanically cutting through vegetation.

9. A vegetation cutting apparatus which comprises:

a support;

means on said support for supplying water under pressure;

a rotating head rotatably mounted on said support and including at least one passage along an axis of said head connected to said means for supplying water under pressure;

at least one nozzle formed on said head for emitting a cutting jet of water in a plane perpendicular to said axis and directly against vegetation with a force and at an angle enabling said jet to cut through the vegetation upon rotation of said head;

means including said nozzle for inducing rotation of said head at least in part by a reaction to said jet; and means apart from said jet on said head for mechanically cutting through vegetation.

10. The apparatus defined in claim 9 wherein said support is in a form of a tube connected to said head at a lower end of said tube and having a handle at an upper end of said tube enabling a user to move said apparatus through vegetation to be cut.

11. The apparatus defined in claim 10, further comprising a water tank at said upper end of said tube forming said means for supplying water under pressure and means mounted on said tank for pressurizing the water in said tank.

* * * * *